Dec. 4, 1973 P. A. J. LEDOUX Re. 27,827

HEATED OR COOLED CEILING OR WALL STRUCTURES

Original Filed April 18, 1968

INVENTOR
Pierre A. J. Ledoux
BY
Pennie, Edmonds, Morton, Taylor & Adams
ATTORNEYS United States Patent Office Re. 27,827
Patented Dec. 4, 1973

27,827
HEATED OR COOLED CEILING OR WALL STRUCTURES

Pierre Alfred Jean Ledoux, Paris, France, assignor to Hunter Douglas International N.V., Willemstad, Curacao Original No. 3,516,486, dated June 23, 1970, Ser. No. 722,487, Apr. 18, 1968. Application for reissue June 22, 1972, Ser. No. 265,357
Claims priority, application France, Apr. 19, 1967, 103,305
Int. Cl. F24h *3/02*
U.S. Cl. 165—54 5 Claims

Matter enclosed in heavy brackets [ ] appears in the original patent but forms no part of this reissue specification; matter printed in italics indicates the additions made by reissue.

ABSTRACT OF THE DISCLOSURE

The present invention relates to panel ceiling and wall structures comprising metal elements constituting the visible ceiling structure and comprising supporting bars or channels upon which said elements are clipped. These supporting channels are hung by means of hanger straps from the ceiling of the building. The invention relates more specifically to the type of ceiling in which the elements which are clipped on the supporting channels are shaped as panels with upturned longitudinal edges thus leaving a free space between their interior wall and the supporting channels which constitute the support means for said panels.

According to the invention one provides at the interior of these panels or partially at the interior of these elements pipe members through which a heat transfer fluid is circulating for heating or cooling the room by the ceiling, the heat transfer fluid may be hot or cold.

Thus a ceiling structure is obtained adding to its inherent characteristics the features of a hot or cold radiating ceiling system.

The invention provides for the use of pipe members for the circulation of fluid, having a diameter which conforms to the upturned interior panel edges, and are maintained in close contact with the latter.

In accordance with an embodiment of the invention, the mounting of the pipe members is achieved by means of detachable clips which are inserted through openings provided in the supporting channels furnishing a heat bridge (intimate metal-to-metal-contact) between the pipe members and the panels.

These and other objects and advantages will be apparent from the following description of an illustrative construction, taken together with the accompanying drawing, in which drawing.

Figure 1:
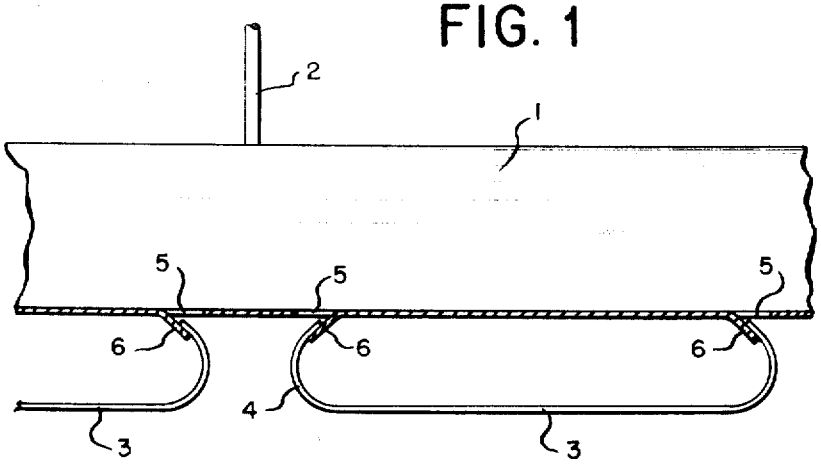
FIG. 1 is a partial section through a ceiling of known construction to which the invention relates.

The ceiling comprises, as known, supporting channels 1, e.g. in the form of a reversed U, a so-called stringer, hung from the rough ceiling of the building by means of support straps 2. To these stringers, mutually spaced properly, the elongated panels 3 are clipped-on-place, e.g. from rolled aluminum constituting the visual appearance of the ceiling.

These panels 3 are made from metal strip having upturned curved longitudinal edges forming concavities 4. The mounting of the panels to the supporting channels 1 is achieved by punching out openings 5 in the lowermost flanges of the reversed U in such a way that tongues 6 or lips 6 are made for clip-on-place engagement of the panels 3 by the edges of said concavities.

According to the invention, one locates at the interior part of the panels 3, against one or both concavities, pipe members 7 through which a hot or cold heating transfer fluid is circulated, depending upon the desire to heat or to cool the locality under said ceiling. These pipe members have a diameter which is in conformity to the inner diameter of the concavities, allowing a good heat transmission between said pipe members and the panels 3.

As shown, it would be of advantage to support the pipe members 7 by means of detachable metal clips 8 inserted through openings 9 provided in the supporting channels 1. Prior thereto the tongue—which has been originally provided for clip-on-place of the panel 3 is pushed back in its opening, whereafter the clip 8 serves the purposes of supporting the pipe member against the concavity of the panel and of support means for said panel.

Following in particular the invention, one may use any appropriate means for support of the pipe members in the interior of the panels 3. The various pipe members of the ceiling can, e.g. be interconnected to constitute a zigzag piping system.

I claim:

1. A heat transfer interior building panel construction comprising a plurality of spaced apart, parallelly arranged elongated, channel-shaped metal panels (3) all of the same width and having profiled supporting flanges extending substantially the full length of the panels along their longer edges (4), at least two parallel elongated main support means (1) arranged transversely to the elongated panels and secured to a building surface, said support means being provided with panel clip-on-means, and a piping system which is connectable to a source of heat transfer fluid and which comprises parallel heat transfer fluid metal pipe members (7) carried by fixing clips (8) secured to said support means (1), the arrangement being such that the metal pipe members (7) are located with at least one of the lower edges (4) at the interior of at least a number of said metal panels (3) and in close metal-to-metal contact with the profile of said longer edge (4) within which it is located.

2. A construction as claimed in claim 1, wherein the fixing clip (8) is of substantial J-shape in cross section, the lower leg of the J locating said fluid pipe member (7), the upper part of said J being secured to said support means (1).

3. A construction as claimed in claim 1 wherein at least one of the said metal pipe members (7) constitutes the said main support means (1) enabling a clip-on-place engagement for said panels (3).

Figure 2:
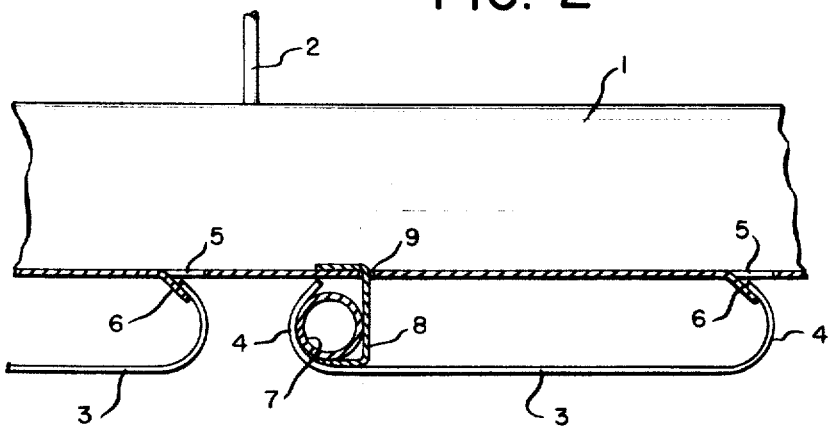
FIG. 2 is a similar section of a ceiling of FIG. 1 to which the invention has been applied.
Figure 3:
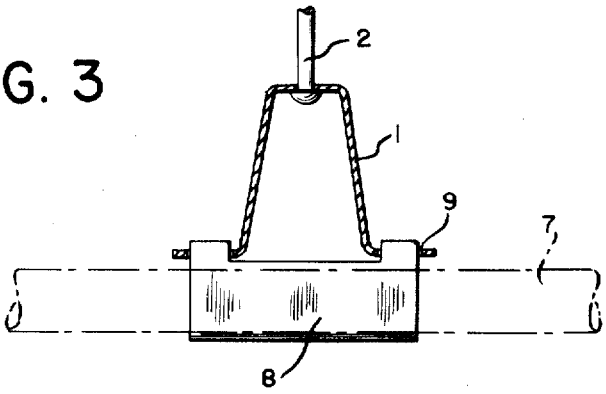
FIG. 3 shows a side elevation of a loose clip for the mounting of a pipe member.

4. A construction according to claim 1 in which the main support means (1) consists of a stringer provided with more than one equidistant pair of panel-clip-on means (6), the arrangement (FIG. 2) being such that from each pair one clip-on-means (6) holds one longer panel edge whereas the opposite longer panel edge is clipped around said metal pipe member (7), which is supported by said fixing clip (8), said pipe member replacing the opposite clip-on-means of said pair.

5. A construction as claimed in claim 1, in which the main support means (1) consists of a stringer having an inverted U-shaped body, the free ends of said body being outwardly extending to form flat flanges provided in the longitudinal direction of the stringer with equidistant pairs of panel-clip-on means (6) and with openings (9), each opening being situated closely to the location of a panel-clip-on means (6), fixing clips (8) of substantially J-shape in cross section, the lower leg of the J locating said fluid pipe member (7), the upper part being secured to one of said flanges of the main support means by being hooked through one of said openings, the arrangement being such that from each pair of at least a number of pairs one clip-on-means (6) holds one longer panel edge, whereas the opposite longer panel edge is clipped around said metal pipe member which is supported by said fixing clip (8), said pipe member replacing the opposite clip-on-means.

References Cited

The following references, cited by the Examiner, are of record in the patented file of this patent or the original patent.

UNITED STATES PATENTS

| | | | |
|---|---|---|---|
| 2,662,746 | 12/1953 | Jorn | 165—56 |
| 2,662,745 | 12/1953 | Jorn et al. | 165—56 |
| 2,782,006 | 2/1957 | Prenger | 165—56 |
| 2,729,431 | 1/1956 | Little | 165—56 |
| 2,818,235 | 12/1957 | Baran | 165—56 |
| 3,366,170 | 1/1968 | Welz | 165—53 |

CHARLES SUKALO, Primary Examiner